(12) United States Patent
Li et al.

(10) Patent No.: US 9,277,416 B2
(45) Date of Patent: Mar. 1, 2016

(54) METHOD AND APPARATUS FOR SCHEDULING RADIO RESOURCES

(71) Applicant: Nokia Corporation, Espoo (FI)

(72) Inventors: Haitao Li, Beijing (CN); Kodo Shu, Shanghai (CN); Rui Wang, Shanghai (CN); Honglin Hu, Shanghai (CN); Huiyue Yi, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/425,937

(22) PCT Filed: Sep. 18, 2012

(86) PCT No.: PCT/CN2012/081555
§ 371 (c)(1),
(2) Date: Mar. 4, 2015

(87) PCT Pub. No.: WO2014/043854
PCT Pub. Date: Mar. 27, 2014

(65) Prior Publication Data
US 2015/0230098 A1    Aug. 13, 2015

(51) Int. Cl.
*H04W 72/00* (2009.01)
*H04W 16/14* (2009.01)
*H04W 16/10* (2009.01)
*H04W 72/04* (2009.01)

(52) U.S. Cl.
CPC .............. *H04W 16/14* (2013.01); *H04W 16/10* (2013.01); *H04W 72/0426* (2013.01); *H04W 72/0453* (2013.01)

(58) Field of Classification Search
CPC . H04W 16/14; H04W 16/10; H04W 72/0426; H04W 72/0453

USPC .......................... 455/450, 454, 453, 509, 522
See application file for complete search history.

(56) References Cited

U.S. PATENT DOCUMENTS

| | | | | |
|---|---|---|---|---|
| 2012/0157110 A1* | 6/2012 | Stjernholm | ......... | H04W 72/082 455/450 |
| 2013/0005379 A1* | 1/2013 | Yamazaki | ........... | H04W 52/143 455/509 |
| 2013/0070626 A1* | 3/2013 | Gaal | ..................... | H04W 48/16 370/252 |

FOREIGN PATENT DOCUMENTS

| | | |
|---|---|---|
| CN | 102378190 A | 3/2012 |
| CN | 102480733 A | 5/2012 |
| WO | 2012081063 A | 6/2012 |

OTHER PUBLICATIONS

International Search Report and Written Opinion received for corresponding Patent Cooperation Treaty Application No. PCT/CN2012/08155, dated Sep. 18, 2012, 10 pages.

* cited by examiner

*Primary Examiner* — Khai M Nguyen
(74) *Attorney, Agent, or Firm* — Nokia Technologies Oy

(57) ABSTRACT

Embodiments of the disclosure provide methods and apparatuses for scheduling radio resources in a communication system. According to the method, in response to receiving a request for accessing a target frequency band utilized by a Macro BS and a LPN from a frequency-shared system, a first notification is transmitted to the Macro BS, such that the Macro BS deactivates the target frequency band, and a second notification is transmitted to the LPN, such that the LPN extends its coverage. Then, information on the extended coverage is received from the LPN.

20 Claims, 6 Drawing Sheets

METHOD AND APPARATUS FOR SCHEDULING RADIO RESOURCES

RELATED APPLICATION

This application was originally filed as Patent Cooperation Treaty Application No. PCT/CN2012/081555 filed Sep. 18, 2015.

FIELD OF THE INVENTION

Embodiments of the present invention generally relate to communication techniques. More particularly, embodiments of the present invention relate to a method and apparatus for scheduling radio resources in a communication system employing an Authorized Shared Access (ASA) scheme.

BACKGROUND OF THE INVENTION

In practical communication networks, such as networks employs GSM (Global System for Mobile Communications), CDMA (Code Division Multiple Access), UMTS (Universal Mobile Telecommunications System) and LTE (Long Term Evolution) technologies, wireless communication users' demand for faster, more reliable, and better multimedia is growing. To accommodate such a growing demand, schemes capable of providing a wide bandwidth have being researched.

Taking the LTE system for example, due to the wide bandwidth requirement, carrier aggregation (CA) is being standardized in 3GPP as part of LTE Release 10, which allows for aggregating non-contiguous spectrum fragments across multiple carriers. Since some operators have access only to rather limited amount of existing spectrum to be used for LTE, it is difficult to provide high data rate LTE services. Accordingly, there is a demand for the LTE system to exploit more additional licensed spectrum.

For solving spectrum scarcity on frequency band and spectrum under-utilization on some other additional licensed band, a spectrum authorization scheme is proposed, named "Authorized Shared Access (ASA)", which allows for a shared use of spectrum using cognitive radio technologies (geo-location databases, sensing, etc.) based on an individual authorization model of spectrum rights, and can act as a regulatory enabler to making available, in a timely manner, harmonized spectrum for mobile broadband while overcoming time, resource and political constraints.

For the ASA spectrum scheme, it is generally assumed that a Macro base station (BS) utilizes existing spectrum as a primary cell (PCell) to provide basic radio-resource control (RRC) signaling and possible low-rate/high-reliability user data; meanwhile, additional licensed carrier under ASA control is used as a secondary cell (SCell) to provide increased capacity. Considering the mobility of ASA spectrum, there is a need to maintain and enhance existing networks for service continuity, as well as load balance and handover scheme. However, there are no existing solutions for scheduling radio resources in a communication system employing the ASA scheme.

In view of the foregoing problem, there is a need to design a solution for scheduling radio resources in a communication system employing the ASA scheme, so as to improve service continuity, load balance and spectrum bandwidth of the communication system.

SUMMARY OF THE INVENTION

The present invention proposes a solution to schedule radio resources in a communication system employing the ASA scheme, so as to improve service continuity, load balance and spectrum bandwidth of the communication system.

According to a first aspect of embodiments of the present invention, embodiments of the invention provide a method for scheduling radio resources in a communication system. The method may comprise: in response to receiving a request for accessing a target frequency band utilized by a Macro BS and a LPN from a frequency-shared system, transmitting a first notification to the Macro BS, such that the Macro BS deactivates the target frequency band, and transmitting a second notification to the LPN, such that the LPN extends its coverage; and receiving information on the extended coverage from the LPN, wherein the target frequency band is an ASA frequency band, and wherein the frequency-shared system is a system licensed to utilize the ASA frequency band.

According to a second aspect of embodiments of the present invention, embodiments of the invention provide a method for scheduling radio resources in a communication system. The method may comprise: in response to receiving a first notification from a controller, deactivating a target frequency band, wherein the first notification is sent from the controller in response to receiving a request for accessing the target frequency band utilized by a Macro BS and a LPN from a frequency-shared system, wherein the target frequency band is an ASA frequency band, and wherein the frequency-shared system is a system licensed to utilize the ASA frequency band.

According to a third aspect of embodiments of the present invention, embodiments of the invention provide a method for scheduling radio resources in a communication system. The method may comprise: in response to receiving a second notification from a controller, extending coverage of a LPN, wherein the second notification is sent from the controller in response to receiving a request for accessing the target frequency band utilized by a Macro BS and the LPN from a frequency-shared system, wherein the target frequency band is an ASA frequency band, and wherein the frequency-shared system is a system licensed to utilize the ASA frequency band.

According to a fourth aspect of embodiments of the present invention, embodiments of the invention provide an apparatus for scheduling radio resources in a communication system. The apparatus may comprise: a transmitter configured to, in response to receiving a request for accessing a target frequency band utilized by a Macro BS and a LPN from a frequency-shared system, transmit a first notification to the Macro BS, such that the Macro BS deactivates the target frequency band, and transmit a second notification to the LPN, such that the LPN extends its coverage; and a receiver configured to receive information on the extended coverage from the LPN, wherein the target frequency band is an ASA frequency band, and wherein the frequency-shared system is a system licensed to utilize the ASA frequency band.

According to a fifth aspect of embodiments of the present invention, embodiments of the invention provide an apparatus for scheduling radio resources in a communication system. The apparatus may comprise: a deactivating unit configured to deactivate a target frequency band in response to receiving a first notification from a controller, wherein the first notification is sent from the controller in response to receiving a request for accessing the target frequency band utilized by a Macro BS and a LPN from a frequency-shared system, wherein the target frequency band is an ASA frequency band, and wherein the frequency-shared system is a system licensed to utilize the ASA frequency band.

According to a sixth aspect of embodiments of the present invention, embodiments of the invention provide an apparatus for scheduling radio resources in a communication system. The apparatus may comprise: an extending unit configured to extend coverage of a LPN in response to receiving a second notification from a controller, wherein the second notification is sent from the controller in response to receiving a request for accessing the target frequency band utilized by a Macro BS and the LPN from a frequency-shared system, wherein the target frequency band is an ASA frequency band, and wherein the frequency-shared system is a system licensed to utilize the ASA frequency band.

According to a seventh aspect of embodiments of the present invention, embodiments of the invention provide an apparatus for scheduling radio resources in a communication system. The apparatus may comprise: at least one processor; and at least one memory including compute program instructions, wherein the at least one memory and computer program instructions are configured to, with the at least one processor, cause the apparatus at least to: in response to receiving a request for accessing a target frequency band utilized by a Macro BS and a LPN from a frequency-shared system, transmit a first notification to the Macro BS, such that the Macro BS deactivates the target frequency band, and transmit a second notification to the LPN, such that the LPN extends its coverage; and receive information on the extended coverage from the LPN, wherein the target frequency band is an ASA frequency band, and wherein the frequency-shared system is a system licensed to utilize the ASA frequency band.

According to an eighth aspect of embodiments of the present invention, embodiments of the invention provide an apparatus for scheduling radio resources in a communication system. The apparatus may comprise: at least one processor; and at least one memory including compute program instructions, wherein the at least one memory and computer program instructions are configured to, with the at least one processor, cause the apparatus at least to: deactivate a target frequency band in response to receiving a first notification from a controller, wherein the first notification is sent from the controller in response to receiving a request for accessing the target frequency band utilized by a Macro BS and a LPN from a frequency-shared system, wherein the target frequency band is an ASA frequency band, and wherein the frequency-shared system is a system licensed to utilize the ASA frequency band.

According to a ninth aspect of embodiments of the present invention, embodiments of the invention provide an apparatus for scheduling radio resources in a communication system. The apparatus may comprise: at least one processor; and at least one memory including compute program instructions, wherein the at least one memory and computer program instructions are configured to, with the at least one processor, cause the apparatus at least to: extend coverage of a LPN in response to receiving a second notification from a controller, wherein the second notification is sent from the controller in response to receiving a request for accessing the target frequency band utilized by a Macro BS and the LPN from a frequency-shared system, wherein the target frequency band is an ASA frequency band, and wherein the frequency-shared system is a system licensed to utilize the ASA frequency band.

In an embodiment, A computer program product comprising at least one computer readable storage medium having a computer readable program code portion stored thereon is provided. The computer readable program code portion may comprise: program code instructions for, in response to receiving a request for accessing a target frequency band utilized by a Macro BS and a LPN from a frequency-shared system, transmitting a first notification to the Macro BS, such that the Macro BS deactivates the target frequency band, and transmitting a second notification to the LPN, such that the LPN extends its coverage; and program code instructions for receiving information on the extended coverage from the LPN, wherein the target frequency band is an ASA frequency band, and wherein the frequency-shared system is a system licensed to utilize the ASA frequency band.

In another embodiment, A computer program product comprising at least one computer readable storage medium having a computer readable program code portion stored thereon is provided. The computer readable program code portion may comprise: program code instructions for deactivating a target frequency band in response to receiving a first notification from a controller, wherein the first notification is sent from the controller in response to receiving a request for accessing the target frequency band utilized by a Macro BS and a LPN from a frequency-shared system, wherein the target frequency band is an ASA frequency band, and wherein the frequency-shared system is a system licensed to utilize the ASA frequency band.

In yet another embodiment, A computer program product comprising at least one computer readable storage medium having a computer readable program code portion stored thereon is provided. The computer readable program code portion may comprise: program code instructions for extending coverage of a LPN in response to receiving a second notification from a controller, wherein the second notification is sent from the controller in response to receiving a request for accessing the target frequency band utilized by a Macro BS and the LPN from a frequency-shared system, wherein the target frequency band is an ASA frequency band, and wherein the frequency-shared system is a system licensed to utilize the ASA frequency band.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
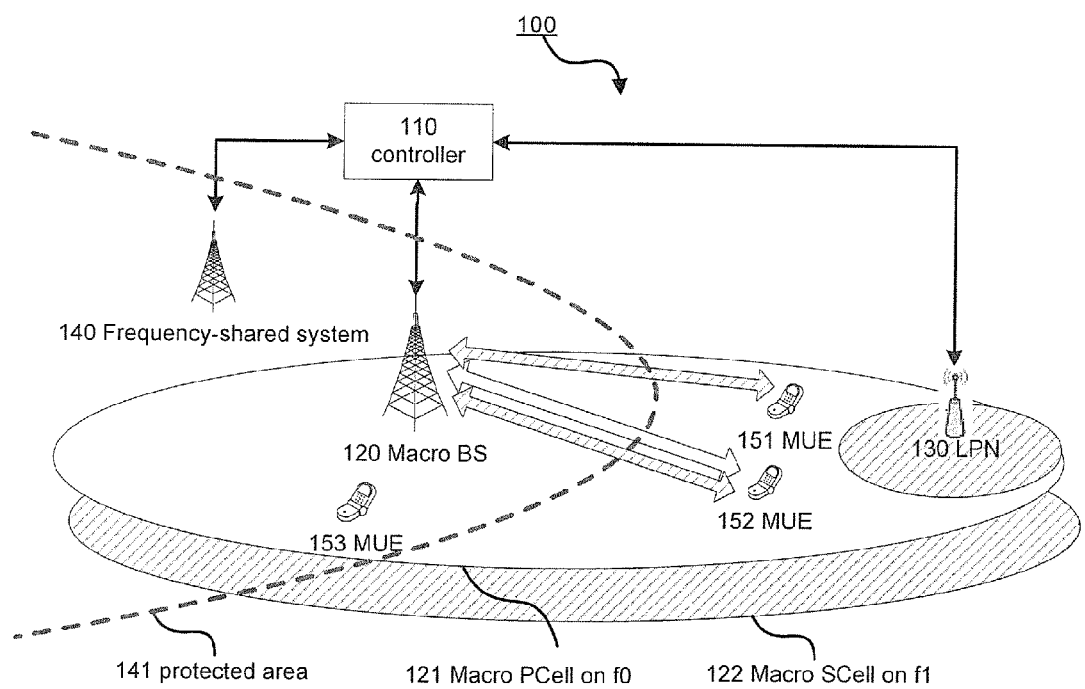
FIG. 1 illustrates a schematic diagram of a communication system 100 according to the prior art.

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

A base station (BS) may refer to a node B (NodeB), an evolved NodeB (eNodeB), a Base Transceiver Station (BTS), an Access Point (AP), a Radio Access Station (RAS), or a Mobile Multihop Relay (MMR)-BS, and some or all of the functions of the BS, the NodeB, the eNodeB, the BTS, the AP, the RAS, or the MMR-BS may be included.

A low power node (LPN) may refer to a micro, pico, Remote Radio Head (RRH), relay, femto, home BS or any other suitable device. The LPN may be distributed in the coverage of a Macro BS in a heterogeneous network (HetNet) which provides a mosaic of coverage, with handoff capability between network elements.

In the disclosure, a frequency-shared system may be is a system licensed to utilize the ASA frequency band. The scheme of ASA is a novel spectrum policy, which aims to enable timely availability and licensed use of harmonized spectrum for mobile with predictable quality of service (QoS), and to dynamic use spectrum by ASA licensees whenever and wherever unused by incumbent users using cognitive radios. The frequency-shared system may be a WiMAX (Worldwide Interoperability for Microwave Access) system, a WiFi (Wireless Fidelity) system, a Bluetooth system or any other suitable system licensed to utilize the ASA frequency band.

Embodiments of the present invention provide a method and apparatus for scheduling radio resources in a communication system employing an ASA scheme. As further discussed below, in some embodiments, the communication system at least comprises a controller (sometimes referred as "ASA controller"), a Macro BS, a LPN and a frequency-shared system, wherein the controller acts as a central controlling unit for scheduling radio resources, e.g., the ASA frequency band, and wherein the Macro BS and the LPN are utilizing the ASA frequency band. When the frequency-shared system wants to use an ASA frequency band, it may request the controller for the target frequency band. Upon receipt of the request, the controller may notify the Macro BS to stop using the target frequency band and notify the LPN to extend its coverage, so the Macro UE (MUE) formerly using the target frequency band avoids call drop or much QoS degradation. Now some exemplary embodiments of the present invention will be described below with reference to the figures.

Reference is first made to FIG. 1, which illustrates a schematic diagram of a communication system 100 according to the prior art.

The communication system 100 may be implemented with a LTE system, a GSM system, a CDMA system, a UMTS system, etc. The system is shown as a LTE system and illustratively comprises a controller 110, a Macro BS 120, a LPN 130 and a frequency-shared system 140, wherein the Macro BS 120 serves three user equipments, MUE 151, MUE 152 and MUE 153. All of the Macro BS 120, the LPN 130 and the frequency-shared system 140 are connected with the controller 110 for ASA spectrum management. The Macro BS 120 uses a LTE carrier f0 as PCell to provide system information, basic radio resource control (RRC) signaling and possible low-rate/high-reliability user data for the UEs it serves; meanwhile the Macro BS aggregates ASA carrier f1 as SCell to provide large amounts of high-rate user data. The UE which uses the aggregated carriers is referred to as a "CA-capable UE". Also there may be some MUEs using single carrier (the LTE carrier f0 or the ASA carrier f1), such as MUE 251, which is not a CA-capable UE. Specifically, the Macro BS 120 employs the ASA frequency band (denoted as "f1") as the carrier for the SCell and another frequency band (denoted as "f0") as the carrier for the PCell, communicates with MUE 151 by using the carrier f1, and communicates with MUE 152 by using both the carriers f0 and f1. The Macro PCell on f0 121 and the Macro SCell on f1 122 are shown in FIG. 1. At the same time, there is a LPN 130, e.g., a Pico eNB, deployed on the carrier f1 as hotspot.

As can be seen from FIG. 1, when the frequency-shared system 140 requests for accessing a target frequency band, which is the ASA frequency band f1, the controller 110 may notify the Macro BS 120 to deactivate or evacuate the target frequency band, as the coverage (denoted as protected area 241) of the frequency-shared system 140 overlaps with the coverage of the Macro BS 120. As such, the Macro BS 120 will, among other things, stop communicating with MUE 151 on the target frequency band f1, as well as stop using the target frequency band f1 as carrier for the SCell in carrier aggregation. As a consequence, the MUE 151 working on the ASA carrier f1 will be forced to inter-frequency hand over to LTE spectrum f0, causing a service interruption; at the same time, the QoS (e.g., data rate) of the MUE 152 aggregating this ASA-based SCC will be much degraded.

Figure 2:
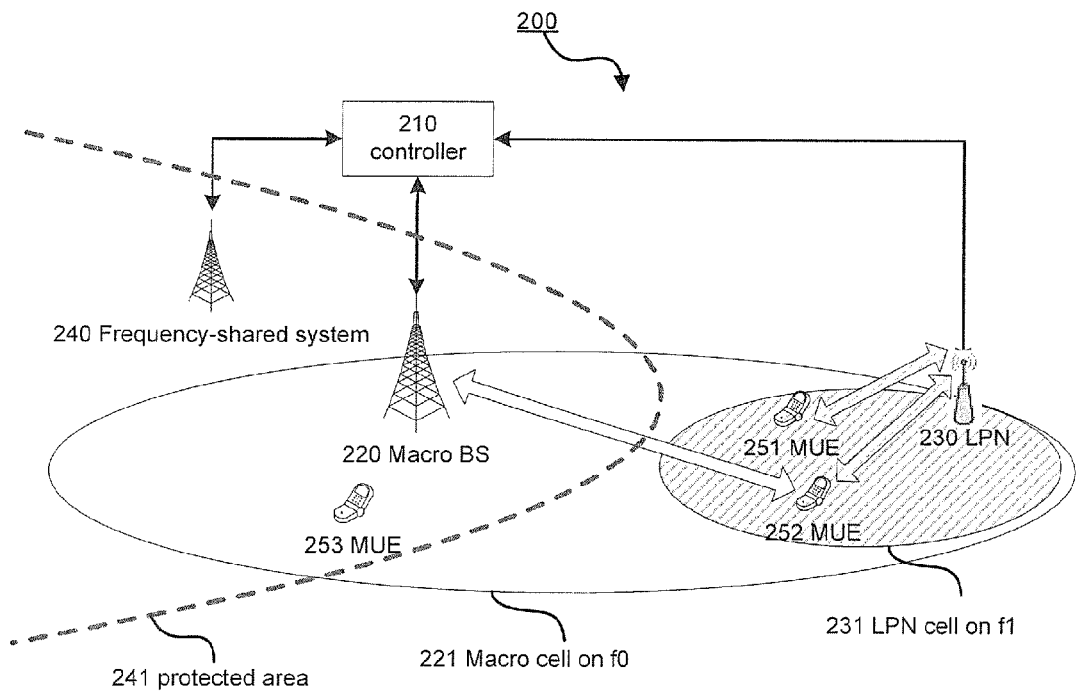
FIG. 2 illustrates a schematic diagram of a communication system 200 according to embodiments of the invention.

Considering the above defects in the prior art, embodiments of the present invention proposes a solution for coordinating ASA frequency band. Reference is now made to FIG. 2, which illustrates a schematic diagram of a communication system 200 according to embodiments of the invention.

Similar to the communication system 100, the communication system 200 may be implemented with a LTE system, a GSM system, a CDMA system, a UMTS system, etc. The system also illustratively comprises a controller 210, a Macro BS 220, a LPN 230 and a frequency-shared system 240, wherein the Macro BS 220 serves three user equipments, MUE 251, MUE 252 and MUE 253. The Macro BS 220, the LPN 230 and the frequency-shared system 240 are connected with the controller 210 for ASA spectrum management. The Macro BS 220 employs the ASA frequency band f1 as the carrier for the SCell and another frequency band f0 as the carrier for the PCell, communicates with MUE 251 by using the carrier f1, and communicates with MUE 252 by using both the carriers f0 and f1. At the same time, there is a LPN 230, e.g., a Pico eNB, deployed on the carrier f1 as hotspot.

Different from the communication system 100 in FIG. 1, when the frequency-shared system 240 requests for accessing a target frequency band f1, wherein the coverage (denoted as protected area 241) of the system 240 overlaps with the coverage of the Macro BS 220, the controller 210 notifies the LPN 230 to extend its coverage, in addition to notify the Macro BS 220 to deactivate or evacuate the target frequency band. As such, the LPN 230 may extend its coverage as much as possible without interfering the coverage of the frequency-shared system 240, e.g., LPN cell on f1 231, so as to provide continuous service to the MUE 251 and MUE 252. The Macro BS may continue using the frequency band f0 in the Macro cell on f0 221, without interfering the protected area 241 of the frequency-shared system 240. In this way, the MUEs formerly using ASA frequency band will not experience call drop or much QoS degradation.

Figure 3:
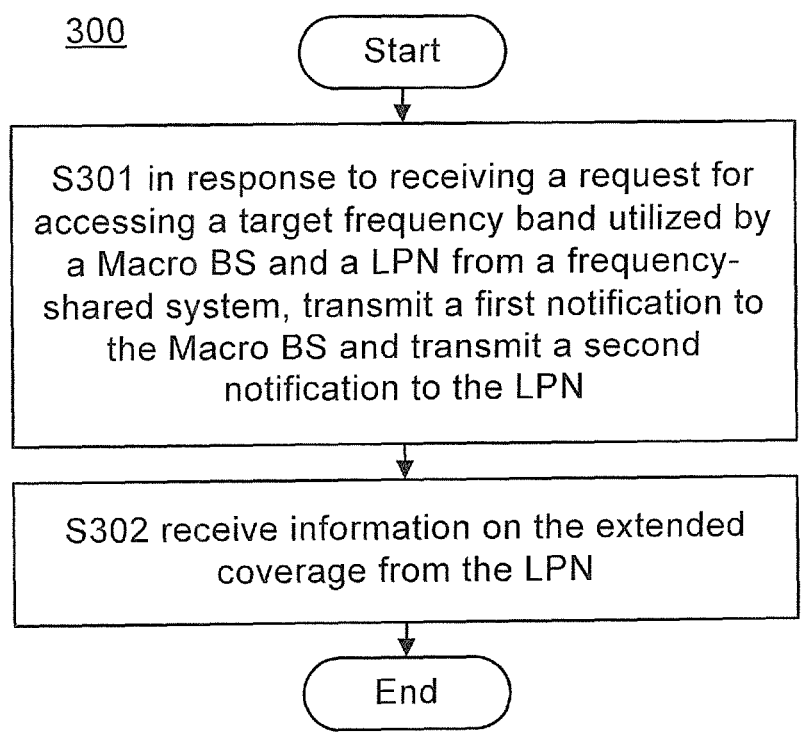
FIG. 3 illustrates a flow chart of a method 300 for scheduling radio resources in a communication system according to embodiments of the invention.

Details for solutions proposed by the present invention will be described in connection with methods illustrated in FIGS. 3-6. Reference is now made to FIG. 3, which illustrates a flow chart of a method 300 for scheduling radio resources in a communication system according to embodiments of the invention. According to embodiments of the present invention, the target frequency band is an ASA frequency band, and the frequency-shared system is a system licensed to utilize the ASA frequency band. In accordance with embodiments of the present invention, the method 300 may be carried out by, for example, a controller, a central unit, a base station, a base station controller (BSC), a gateway, a relay, a server, or any other applicable device.

At step S301, in response to receiving a request for accessing a target frequency band utilized by a Macro BS and a LPN from a frequency-shared system, a first notification is transmitted to the Macro BS and a second notification is transmitted to the LPN.

According to embodiments of the present invention, upon the request from the frequency-shared system, the controller transmits a first notification and a second notification to the Macro BS and the LPN, e.g., after a period of time, which depends on the tolerance of the frequency-shared system (e.g., 2 seconds for a TV system). Specifically, the first notification may be transmitted, e.g. from the controller 210, to the Macro BS, such that the Macro BS deactivates the target frequency band; and a second notification may be transmitted, e.g. from the controller 210, to the LPN, such that the LPN extends its coverage. After the LPN extends its coverage, the information on the extended coverage may be sent from the LPN to the controller so that the controller may sent the information on the extended coverage of the LPN to the Macro BS, such that the Macro BS configures its UEs to handover or to enter into inter-site CA with the Macro BS and the LPN. As an alternative, the information on the extended coverage may be sent to both of the controller and the Macro BS.

According to embodiments of the present invention, the first notification may be transmitted to the Macro BS by: transmitting the first notification to the Macro BS, such that the Macro BS deactivates the target frequency band by: identifying a user equipment (UE) which is being served by the Macro BS and located in an extended coverage of the LPN; determining whether the UE is a carrier aggregation (CA)-capable UE; configuring the UE to enter into inter-site CA with the Macro BS and the LPN if the UE is a CA-capable UE; and configuring the UE to handover to the extended coverage of the LPN if the UE is not a CA-capable UE. It is to be noted that the first notification may be implemented in any suitable form, for example, added into an existing signaling or defined in a new signaling.

According to embodiments of the present invention, the second notification may be transmitted to the LPN by: obtaining information on a protected area in which the frequency-shared system is to utilize the target frequency band; and transmitting the second notification including the information on the protected area to the LPN, such that the LPN extends its coverage based on the information on the protected area. It is to be noted that the second notification may be implemented in any suitable form, for example, added into an existing signaling or defined in a new signaling.

In accordance with the embodiments of the present invention, the extended coverage and the protected area do not overlap. When the controller notifies the LPN to extend its coverage, the controller may also inform the protected area of the frequency-shared system to the LPN, so as that no strong interference is introduced to the frequency-shared system. The protected area indicates information on the coverage of the frequency-shared system. With the knowledge of the protected area, the LPN may extend its coverage as large as possible without interfering the frequency-shared system.

In some embodiments, the LPN may extend its coverage by adjusting transmission power and/or beam direction. Specifically, according to the second notification, the LPN (e.g., a pico eNB) may perform coverage extension based on its available radio resources, e.g., transmission power limit, beam direction limit, etc. After pico cell coverage extension, the pico eNB may report information on the extended coverage to the controller. The coverage of the pico eNB may be extended by adjusting the transmission power, the beam direction and/or other related radio resources. This information on the extended coverage is advantageous for the ASA controller to monitor and manage ASA spectrum allocation.

At step S302, information on the extended coverage is received from the LPN.

According to embodiments of the present invention, the information on the extended coverage of the LPN may comprise an indication which indicates that the LPN has extended its coverage, information on transition power of the LPN, information on beam direction of the LPN, and so on.

In some embodiments, information on the extended coverage may only comprise the indication which indicates that the LPN has extended its coverage. For example, in a case that the MUE's location (e.g., GPS information) is not available, the Macro BS only needs to be informed that the LPN has extended its coverage.

In some other embodiments, at step S302, the controller may receive the information on the extended coverage from the LPN by receiving at least one of: an indication which indicates that the LPN has extended its coverage; information on transition power of the LPN; and information on beam direction of the LPN.

Figure 4:
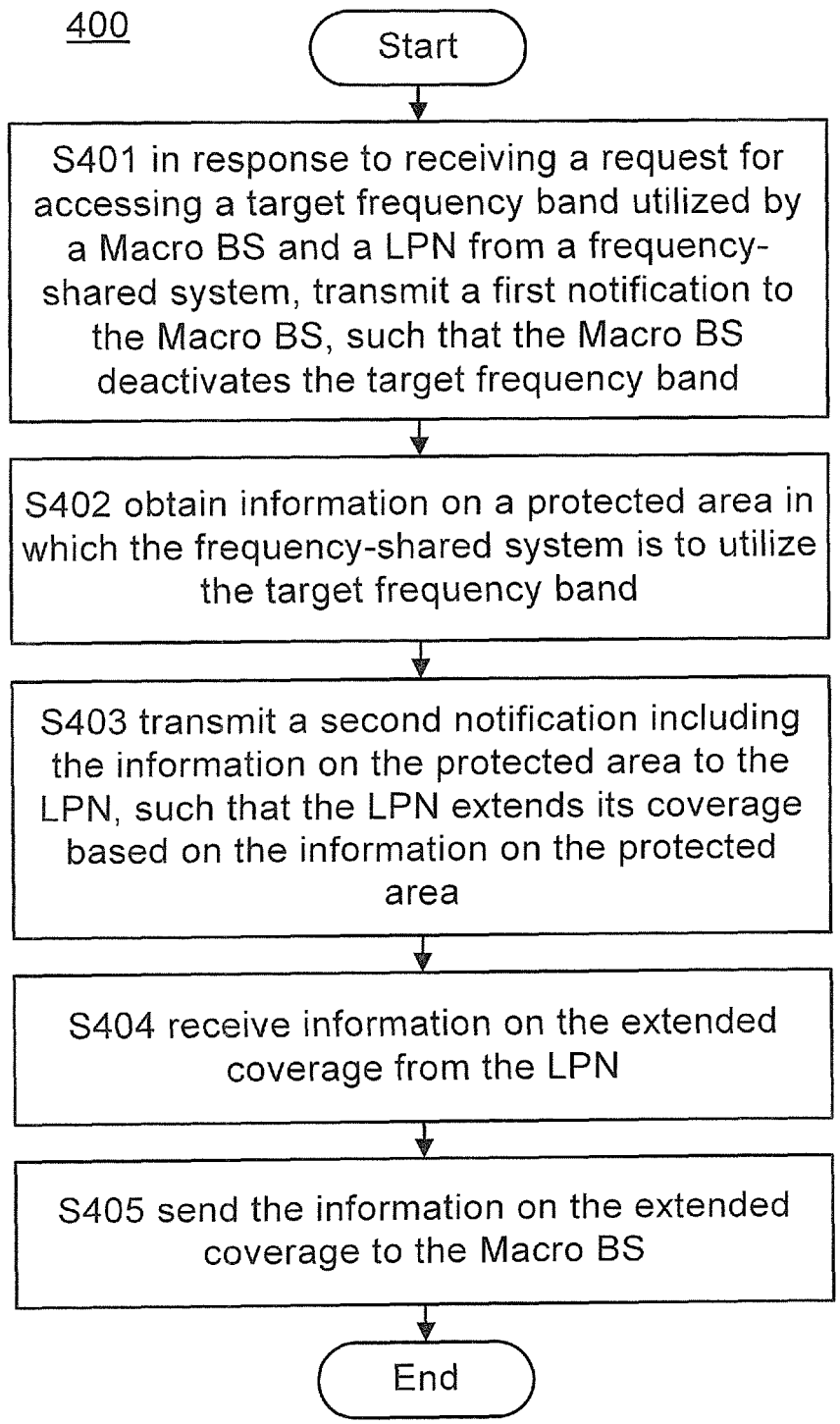
FIG. 4 illustrates a flow chart of a method 400 for scheduling radio resources in a communication system according to embodiments of the invention.

Reference is now made to FIG. 4, which illustrates a flow chart of a method 400 for scheduling radio resources in a communication system according to embodiments of the invention. The method 400 may be considered as an embodiment of the method 300 described above with reference to FIG. 3. In the following description of the method 400, information on the protected area of the frequency-shared system is included in the second notification to be transmitted to the LPN, such that the LPN extends its coverage based on the information on the protected area. Subsequently, the information on the extended coverage is sent from the LPN to the controller, and then sent from the controller to the Macro BS. However, it is noted that this is only for the purpose of illustrating the principles of the present invention, rather than limiting the scope thereof.

The method 400 may be carried out by the same device as the method 300, for example, a controller, a central unit, a base station, a base station controller (BSC), a gateway, a relay, a server, or any other applicable device.

At step S401, in response to receiving a request for accessing a target frequency band utilized by a Macro BS and a LPN from a frequency-shared system, a first notification is transmitted to the Macro BS, such that the Macro BS deactivates the target frequency band.

At step S402, information on a protected area in which the frequency-shared system is to utilize the target frequency band is obtained.

At step S403, a second notification including the information on the protected area to the LPN is transmitted, such that the LPN extends its coverage based on the information on the protected area.

At step S404, information on the extended coverage is received from the LPN.

According to embodiments of the present invention, the information on the extended coverage of the LPN may comprise an indication which indicates that the LPN has extended its coverage, information on transition power of the LPN, information on beam direction of the LPN, and so on.

In some embodiments, the controller may receive only an indication that the LPN has extended its coverage. In some other embodiments, the controller may receive at least one of the following: the indication that the LPN has extended its coverage, information on transition power of the LPN, information on beam direction of the LPN, etc.

At step S405, the information on the extended coverage is sent to the Macro BS.

As described above, according to embodiments of the present invention, the information on the extended coverage may be sent to the Macro BS from the controller; alternatively, this information may be sent to the Macro BS directly from the LPN. In the embodiments illustrated with respect to FIG. 4, the former is adopted, which is only for illustration, rather than limitation.

Above embodiments illustrated in connection with FIGS. 3 and 4 are related to operations performed at the controller, e.g., controller 210 shown in FIG. 2, for scheduling radio resources. Further, the present invention proposes a method for scheduling radio resources to be performed at the Macro BS. In accordance with the embodiments of the present invention, a method for scheduling radio resources may comprise deactivating a target frequency band in response to receiving a first notification from a controller, wherein the first notification is sent from the controller in response to receiving a request for accessing the target frequency band utilized by a Macro BS and a LPN from a frequency-shared system, wherein the target frequency band is an ASA frequency band, and wherein the frequency-shared system is a system licensed to utilize the ASA frequency band. In accordance with embodiments of the present invention, this method may be carried out by a Macro BS, for example, a Macro eNodeB (eNB) or some other suitable device.

According to embodiments of the present invention, the target frequency band may be deactivated by identifying a user equipment (UE) which is being served by the Macro BS and located in an extended coverage of the LPN; determining whether the UE is a CA-capable UE; configuring the UE to enter into inter-site CA with the Macro BS and the LPN if the UE is a CA-capable UE; and configuring the UE to handover to the extended coverage of the LPN if the UE is not a CA-capable UE. The method 500 shown in FIG. 5 may be considered as an embodiment of this method.

Figure 5:
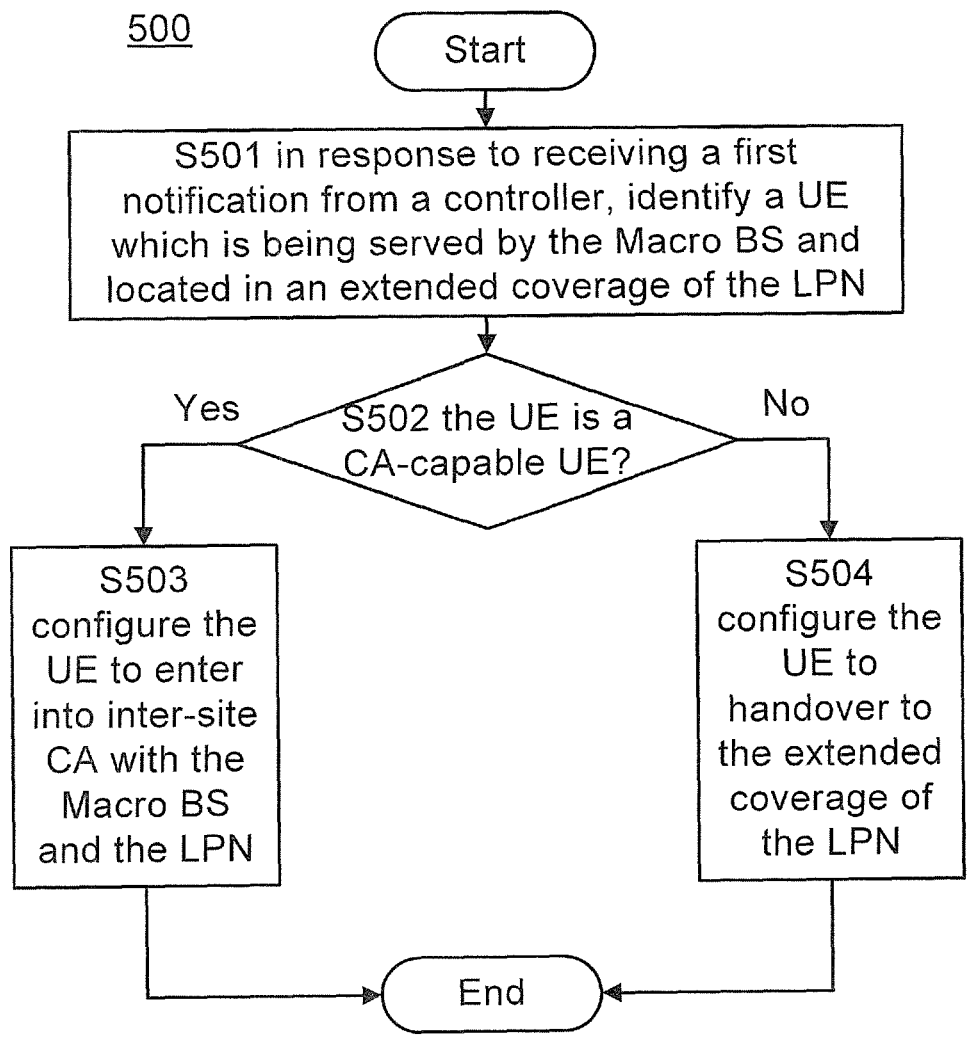
FIG. 5 illustrates a flow chart of a method 500 for scheduling radio resources in a communication system according to embodiments of the invention.

Reference is now made to FIG. 5, which illustrates a flow chart of a method 500 for scheduling radio resources in a communication system according to embodiments of the invention. In accordance with embodiments of the present invention, the method 500 may be carried out by a Macro BS, for example, a Macro eNodeB (eNB) or some other suitable device.

At step S501, in response to receiving a first notification from a controller, a UE which is being served by the Macro BS and located in an extended coverage of the LPN is identified.

Taking the communication system 200 illustrated in FIG. 2 for example, upon receipt of the first notification, which notifies that the Macro BS 220 to deactivate the target frequency band, from the controller 210, the Macro BS 220 may begin to prepare evacuating the target frequency band. As mentioned above, the LPN 230 may extend its coverage in response to the second notification from the controller 210. The information on the extended coverage may be sent to the Macro BS from the controller; alternatively, this information may be sent to the Macro BS directly from the LPN. In other words, the information on the extended coverage of the LPN may be either received from the LPN or from the controller. Once this information is received, the Macro BS may first obtain the location(s) of the UE(s) it serves (that is, MUE(s)) and then compare the location(s) with the extended coverage of the LPN, so as to identify which MUE is located in the extended coverage of the LPN. The location of a UE may be obtained by achieving the GPS information of the UE.

At step S502, whether the UE is a CA-capable UE is determined.

The CA-capable UE is a user equipment that communicates with its serving BS by using the carrier aggregation scheme. Being a serving BS, the Macro BS may have the knowledge of whether a MUE is a CA-capable UE. With this knowledge, it may be determined that a UE identified at step S501 is a CA-capable UE. If it is determined that the UE identified at step S501 is a CA-capable UE, the UE may be configured to enter into inter-site CA with the Macro BS and the LPN; and if it is determined that the UE identified at step S501 is not a CA-capable UE (also called as "non-CA UE"), the UE may be configured to handover to the extended coverage of the LPN.

At step S503, the UE is configured to enter into inter-site CA with the Macro BS and the LPN.

At step S504, the UE is configured to handover to the extended coverage of the LPN.

In the communication system 200, it is assumed that non-CA UEs working on ASA carrier f1, and CA mode UEs working on LTE carrier f0 and aggregating the ASA carrier f1. The ASA carrier f1 is the target frequency band.

For the CA-capable UE(s) working on LTE carrier f0 and aggregating ASA carrier f1, it/they may maintain RRC connection with the Macro eNB, and split an amount of high-rate user data to the LPN, e.g. a pico. In some embodiments, a user plane stream is delivered using LTE carrier f0 on macro cell and ASA carrier f1 on pico cell via inter-site CA operation. As an alternative, the high data rate user plane stream may be delivered using only pico cell on ASA carrier f1 (e.g. soft cell-like operation).

For the non-CA UE(s) working on ASA carrier f1, the Macro eNB may configure it/them normally handover from macro cell to pico cell.

Figure 6:
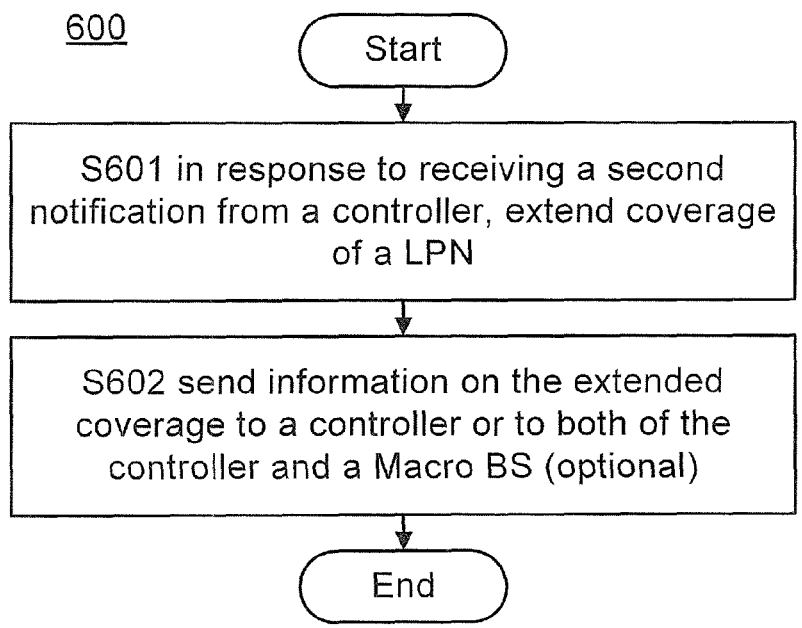
FIG. 6 illustrates a flow chart of a method 600 for scheduling radio resources in a communication system according to embodiments of the invention.

Reference is now made to FIG. 6, which illustrates a flow chart of a method 600 for scheduling radio resources in a communication system according to embodiments of the invention. According to embodiments of the present invention, the second notification is sent from the controller in response to receiving a request for accessing the target frequency band utilized by a Macro base station (BS) and the LPN from a frequency-shared system, the target frequency band is an authorized shared access (ASA) frequency band, and the frequency-shared system is a system licensed to utilize the ASA frequency band. In accordance with embodiments of the present invention, the method 600 may be carried out by a LPN, for example, a micro, pico, RRH, a relay, femto, home BS or any other suitable device.

At step S601, in response to receiving a second notification from a controller, coverage of a LPN is extended.

In accordance with embodiments of the present invention, during extending the coverage, information on a protected area in which the frequency-shared system is to utilize the target frequency band may be obtained from the second notification, and then the coverage may be extended based on the information on the protected area. According to the received second notification, the LPN (e.g., a pico eNB) may perform coverage extension based on its available radio resources, such as transmission power limit and/or beam direction limit, in view of the protected area of the frequency-shared system. In a practical system, restrictions, e.g., RF capacity, on the LPN may also be taken into account. According to embodiments of the present invention, the extended coverage and the protected area do not overlap.

At step S602, information on the extended coverage is sent to a controller or to both of the controller and a Macro BS (optional).

It is to be noted that it is optional to send the information on the extended coverage according to embodiments of the present invention. In other words, the method according to the present invention may be performed without the optional step S602.

The information on the extended coverage may comprise some or all of an indication which indicates that the LPN has extended its coverage, information on transition power of the LPN, information on beam direction of the LPN, and so on.

According to embodiments of the present invention, the LPN may only send the indication which indicates that the LPN has extended its coverage as the information on the extended coverage. According to some other embodiments, the LPN may send at least one of an indication which indicates that the LPN has extended its coverage, information on transition power of the LPN, and information on beam direction of the LPN, so as to provide more details of the extended coverage.

In some embodiments, the information on the extended coverage is sent from the LPN to the controller, and then the controller may send this information to the Macro BS. In some other embodiments, the LPN may send the information on the extended coverage to the Macro BS directly, as well as the controller.

Figure 7:
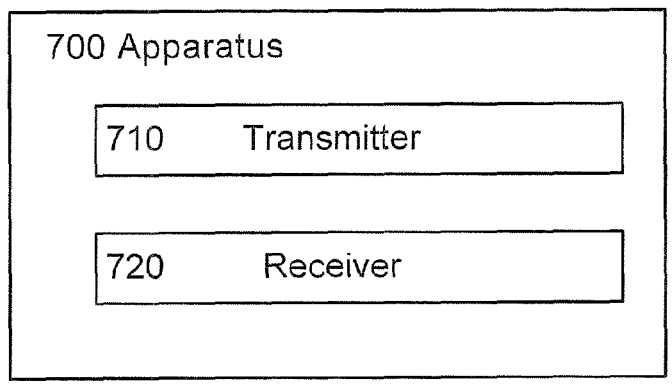
FIG. 7 illustrates a block diagram of an apparatus 700 for scheduling radio resources in a communication system according to embodiments of the invention.

Reference is now made to FIG. 7, which illustrates a block diagram of an apparatus 700 for scheduling radio resources in a communication system according to embodiments of the invention. As shown, the apparatus 700 comprises: a transmitter 710 configured to, in response to receiving a request for accessing a target frequency band utilized by a Macro base station (BS) and a low power node (LPN) from a frequency-shared system, transmit a first notification to the Macro BS, such that the Macro BS deactivates the target frequency band, and transmit a second notification to the LPN, such that the LPN extends its coverage; and a receiver 720 configured to receive information on the extended coverage from the LPN. According to embodiments of the present invention, the target frequency band is an ASA frequency band, and the frequency-shared system is a system licensed to utilize the ASA frequency band. In accordance with embodiments of the present invention, the apparatus 700 may be implemented in, for example, a controller, a central unit, a base station, a base station controller (BSC), a gateway, a relay, a server, or any other applicable device.

In accordance with embodiments of the present invention, the apparatus 700 may further comprise a sending unit (not shown) configured to send the information on the extended coverage to the Macro BS.

In accordance with embodiments of the present invention, the information on the extended coverage may be sent to the Macro BS from the LPN.

In accordance with embodiments of the present invention, the receiver 720 may comprise a receiving unit configured to receive at least one of: an indication which indicates that the LPN has extended its coverage; information on transition power of the LPN; and information on beam direction of the LPN.

In accordance with embodiments of the present invention, the transmitter 710 may comprise: an obtaining unit configured to obtain information on a protected area in which the frequency-shared system is to utilize the target frequency band; and a second transmitting unit configured to transmit the second notification including the information on the protected area to the LPN, such that the LPN extends its coverage based on the information on the protected area.

In accordance with embodiments of the present invention, the extended coverage and the protected area do not overlap.

In accordance with embodiments of the present invention, the LPN may extend its coverage by adjusting transmission power and/or beam direction.

In accordance with embodiments of the present invention, the transmitter 710 may comprise: a first transmitting unit configured to transmit the first notification to the Macro BS, such that the Macro BS deactivates the target frequency band by: identifying a user equipment (UE) which is being served by the Macro BS and located in an extended coverage of the LPN; determining whether the UE is a CA-capable UE; configuring the UE to enter into inter-site CA with the Macro BS and the LPN if the UE is a CA-capable UE; and configuring the UE to handover to the extended coverage of the LPN if the UE is not a CA-capable UE.

Figure 8:
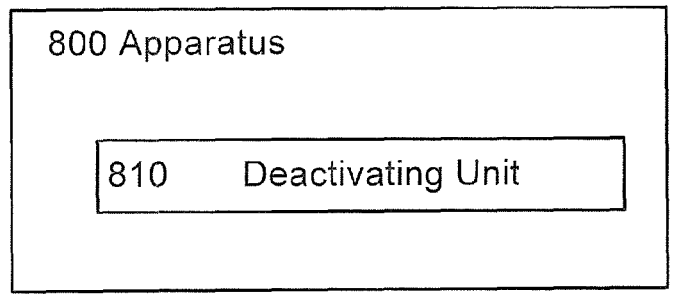
FIG. 8 illustrates a block diagram of an apparatus 800 for scheduling radio resources in a communication system according to embodiments of the invention.

Reference is now made to FIG. 8, which illustrates a block diagram of an apparatus 800 for scheduling radio resources in a communication system according to embodiments of the invention. As shown, the apparatus 800 comprises: a deactivating unit 810 configured to deactivate a target frequency band in response to receiving a first notification from a controller, wherein the first notification is sent from the controller in response to receiving a request for accessing the target frequency band utilized by a Macro base station (BS) and a low power node (LPN) from a frequency-shared system, wherein the target frequency band is an authorized shared access (ASA) frequency band, and wherein the frequency-shared system is a system licensed to utilize the ASA frequency band. In accordance with embodiments of the present invention, the apparatus 800 may be implemented in a Macro BS, for example, a Macro eNodeB (eNB) or some other suitable device.

In accordance with embodiments of the present invention, the deactivating unit 810 may comprise: identifying means configured to identify a user equipment (UE) which is being served by the Macro BS and located in an extended coverage of the LPN; determining means configured to determine whether the UE is a CA-capable UE; first configuring means configured to configure the UE to enter into inter-site CA with the Macro BS and the LPN if the UE is a CA-capable UE; and second configuring means configured to configure the UE to handover to the extended coverage of the LPN if the UE is not a CA-capable UE.

Figure 9:
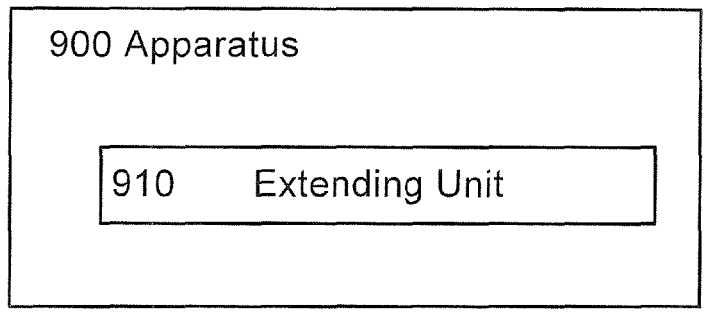
FIG. 9 illustrates a block diagram of an apparatus 900 for scheduling radio resources in a communication system according to embodiments of the invention.

Reference is now made to FIG. 9, which illustrates a block diagram of an apparatus 900 for scheduling radio resources in a communication system according to embodiments of the invention. As shown, the apparatus 900 comprises: an extending unit 910 configured to extend coverage of a low power node (LPN) in response to receiving a second notification from a controller, wherein the second notification is sent from the controller in response to receiving a request for accessing the target frequency band utilized by a Macro base station (BS) and the LPN from a frequency-shared system, wherein the target frequency band is an authorized shared access (ASA) frequency band, and wherein the frequency-shared system is a system licensed to utilize the ASA frequency band. In accordance with embodiments of the present invention, the apparatus 900 may be implemented in a LPN, for example, a micro, pico, RRH, a relay, femto, home BS or any other suitable device.

In accordance with embodiments of the present invention, the extending unit 910 may comprise: obtaining means configured to obtain information on a protected area in which the frequency-shared system is to utilize the target frequency band from the second notification; and extending means configured to extend the coverage based on the information on the protected area.

In accordance with embodiments of the present invention, the extended coverage and the protected area do not overlap.

In accordance with embodiments of the present invention, the extending unit may comprise: adjusting means configured to adjust transmission power and/or beam direction of the LPN.

In accordance with embodiments of the present invention, the apparatus 900 may further comprise a first sending unit (not shown) configured to send information on the extended coverage to the controller; or a second sending unit (not shown) configured to send information on the extended coverage to the controller and the Macro BS.

In accordance with embodiments of the present invention, the first sending unit or the second sending unit may comprise sending means configured to send at least one of: an indication which indicates that the LPN has extended its coverage; information on transition power of the LPN; and information on beam direction of the LPN.

It is noted that the apparatus 700 may be configured to implement functionalities as described with reference to FIGS. 3-4, the apparatus 800 may be configured to implement functionalities as described with reference to FIG. 5, and the apparatus 900 may be configured to implement functionalities as described with reference to FIG. 6. Therefore, the features discussed with respect to any of methods 300-400 may apply to the corresponding components of the apparatus 700, the features discussed with respect to the method 500 may apply to the corresponding components of the apparatus 800, and the features discussed with respect to the method 600 may apply to the corresponding components of the apparatus 900. It is further noted that the components of the apparatus 700, 800 or 900 may be embodied in hardware, software, firmware, and/or any combination thereof. For example, the components of the apparatus 700, 800 or 900 may be respectively implemented by a circuit, a processor or any other appropriate selection device. Those skilled in the art will appreciate that the aforesaid examples are only for illustration not limitation.

In some embodiment of the present disclosure, the apparatus 700, 800 or 900 comprises at least one processor. The at least one processor suitable for use with embodiments of the present disclosure may include, by way of example, both general and special purpose processors already known or developed in the future. The apparatus 700, 800 or 900 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 700, 800 or 909 to at least perform according to methods as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 3-6 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

Figure 10:
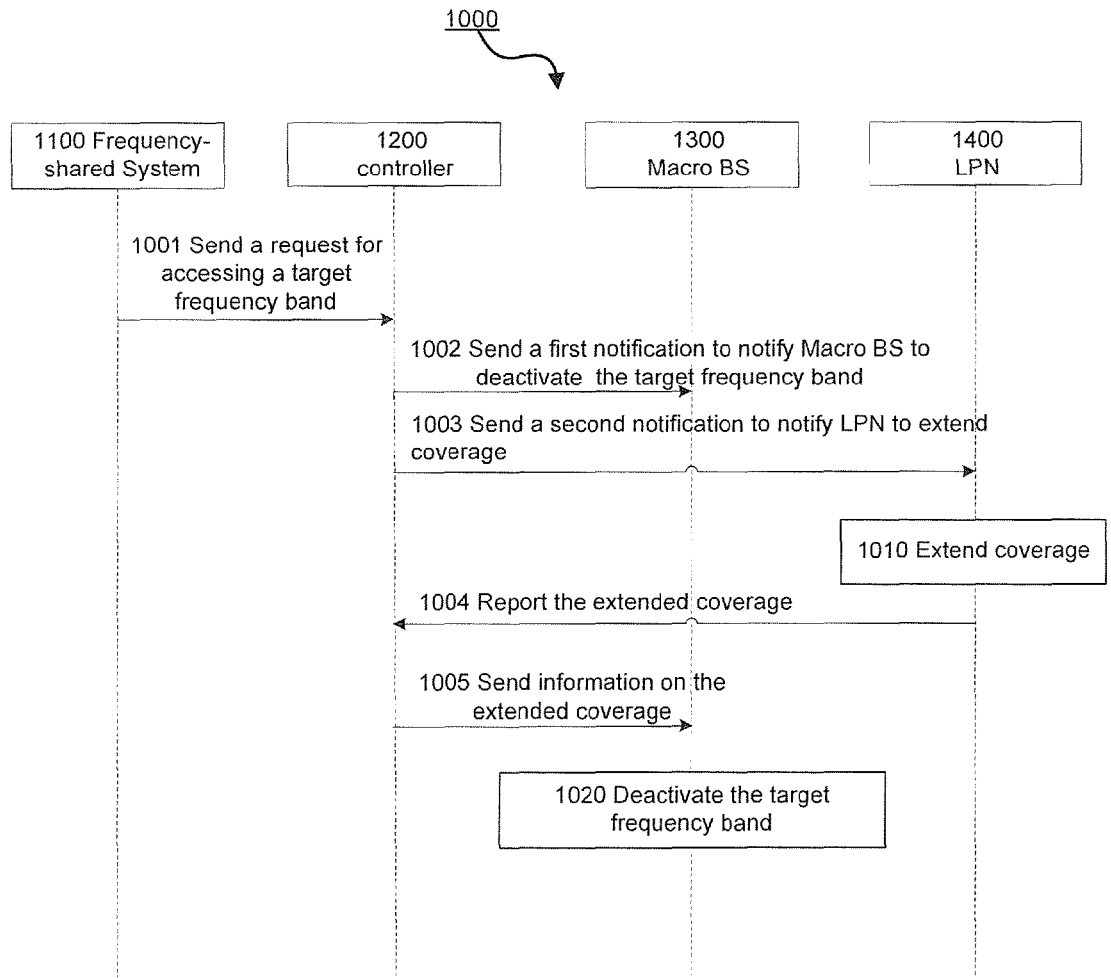
FIG. 10 illustrates a schematic diagram 1000 for scheduling radio resources in a communication system according to embodiments of the invention.

Reference is now made to FIG. 10, which illustrates a schematic diagram 1000 for scheduling radio resources in a communication system according to embodiments of the invention. The communication system may be, e.g., implemented as the system 200 shown in FIG. 2.

As is shown, according to embodiments of the present invention, the frequency-shared system 1100 may first send 1001 a request for accessing a target frequency band to the controller 1200. In response to the request, the controller 1200 sends 1002 a first notification to notify Macro BS 1300 to deactivate the target frequency band, and sends 1003 a second notification to notify LPN 1400 to extend coverage.

According to the second notification, the LPN 1400 may extend 1010 its coverage, e.g., by adjusting the beam direction, increasing transmission power, etc. Then, the LPN 1400 may report 1004 the extended coverage to the controller 1200, e.g., sending information on the extended coverage to the controller 1200. Upon receiving the information, the controller 1200 may send the information on the extended coverage to the Macro BS 1300, so that the Macro BS 1300 evacuate or deactivate 1020 the target frequency band.

As an alternative, the information on the extended coverage of the LPN may be send from the LPN 1400 to the Macro BS 1300 as well as the controller 1200. In this way, the step of 1005 may be skipped.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method, comprising:
   in response to receiving a request for accessing a target frequency band utilized by a macro base station and a low power node from a frequency-shared system,
   transmitting a first notification to the macro base station, such that the macro base station deactivates the target frequency band, and
   transmitting a second notification to the low power node, such that the low power node extends its coverage; and
   receiving information on the extended coverage from the low power node,
   wherein the target frequency band is an authorized shared access frequency band, and wherein the frequency-shared system is a system licensed to utilize the authorized shared access frequency band.

2. The method as recited in claim 1, further comprising: sending the information on the extended coverage to the macro base station.

3. The method as recited in claim 1, wherein the information on the extended coverage is sent to the macro base station from the low power node.

4. The method as recited in claim 1, wherein receiving information on the extended coverage from the low power node comprises receiving at least one of:
   an indication which indicates that the low power node has extended its coverage;
   information on transition power of the low power node; and
   information on beam direction of the low power node.

5. The method as recited in claim 1, wherein transmitting a second notification to the low power node comprises:
   obtaining information on a protected area in which the frequency-shared system is to utilize the target frequency band; and
   transmitting the second notification including the information on the protected area to the low power node for the low power node to extend its coverage based on the information on the protected area.

6. The method as recited in claim 1, wherein the low power node extends its coverage by adjusting at least one of transmission power and beam direction.

7. The method as recited in claim 1, wherein transmitting a first notification to the macro base station comprises:
   transmitting the first notification to the macro base station, such that the macro base station deactivates the target frequency band by: identifying a user equipment which is being served by the macro base station and located in an extended coverage of the low power node; determining whether the user equipment is a carrier aggregation-capable user equipment; configuring the user equipment to enter into inter-site carrier aggregation with the macro base station and the low power node if the user equipment is a carrier aggregation-capable user equipment; and configuring the user equipment to handover to the extended coverage of the low power node if the user equipment is not a carrier aggregation-capable user equipment.

8. An apparatus, comprising:
   at least one processor; and
   at least one memory including compute program instructions,
   wherein the at least one memory and computer program instructions are configured to, with the at least one processor, cause the apparatus at least to:
   in response to receiving a request for accessing a target frequency band utilized by a macro base station and a low power node from a frequency-shared system,
   transmit a first notification to the macro base station, such that the macro base station deactivates the target frequency band, and transmit a second notification to the low power node, such that the low power node extends its coverage; and receive information on the extended coverage from the low power node, wherein the target frequency band is an authorized shared access frequency band, and wherein the frequency-shared system is a system licensed to utilize the authorized shared access frequency band.

9. The apparatus as recited in claim 8, wherein the at least one memory and computer program instructions are further configured to, with the at least one processor, cause the apparatus at least to:

send the information on the extended coverage to the macro base station.

10. The apparatus as recited in claim 8, wherein the information on the extended coverage is sent to the macro base station from the low power node.

11. The apparatus as recited in claim 8, wherein the at least one memory and computer program instructions are further configured to, with the at least one processor, cause the apparatus to receive information on the extended coverage, at least receive one of the following:

an indication which indicates that the low power node has extended its coverage;
information on transition power of the low power node; and
information on beam direction of the low power node.

12. The apparatus as recited in claim 8, wherein the at least one memory and computer program instructions are further configured to, with the at least one processor, cause the apparatus to transmit a second notification to the low power node, at least to:

obtain information on a protected area in which the frequency-shared system is to utilize the target frequency band; and
transmit the second notification including the information on the protected area to the low power node, such that the low power node extends its coverage based on the information on the protected area.

13. The apparatus as recited in claim 12, wherein the extended coverage and the protected area do not overlap.

14. The apparatus as recited in claim 8, wherein the low power node extends its coverage by adjusting at least one of transmission power and beam direction.

15. The apparatus as recited in claim 8, wherein the at least one memory and computer program instructions are further configured to, with the at least one processor, cause the apparatus to transmit a first notification to the macro base station, at least to:

transmit the first notification to the macro base station, such that the macro base station deactivates the target frequency band by: identifying a user equipment which is being served by the macro base station and located in an extended coverage of the low power node; determining whether the user equipment is a carrier aggregation-capable user equipment; configuring the user equipment to enter into inter-site carrier aggregation with the macro base station and the low power node if the user equipment is a carrier aggregation-capable user equipment; and configuring the user equipment to handover to the extended coverage of the low power node if the user equipment is not a carrier aggregation-capable user equipment.

16. An apparatus, comprising:
at least one processor; and
at least one memory including compute program instructions,
wherein the at least one memory and computer program instructions are configured to, with the at least one processor, cause the apparatus at least to:
extend coverage of a low power node in response to receiving a second notification from a controller,
wherein the second notification is received from the controller, the second notification corresponding to a request for accessing the target frequency band utilized by a macro base station and the low power node from a frequency-shared system,
wherein the target frequency band is an authorized shared access frequency band, and
wherein the frequency-shared system is a system licensed to utilize the authorized shared access frequency band.

17. The apparatus as recited in claim 16, wherein the at least one memory and computer program instructions are further configured to, with the at least one processor, cause the apparatus to:

obtain information on a protected area in which the frequency-shared system is to utilize the target frequency band from the second notification; and
extend the coverage based on the information on the protected area.

18. The apparatus as recited in claim 16, wherein the at least one memory and computer program instructions are further configured to, with the at least one processor, cause the apparatus to:

adjust at least one of transmission power and beam direction of the low power node.

19. The apparatus as recited in claim 16, wherein the at least one memory and computer program instructions are further configured to, with the at least one processor, cause the apparatus at least to perform one of the following:

send information on the extended coverage to the controller; and
send information on the extended coverage to the controller and the macro base station.

20. The apparatus as recited in claim 19, wherein the at least one memory and computer program instructions are further configured to, with the at least one processor, cause the apparatus to send at least one of the following:

an indication which indicates that the low power node has extended its coverage;
information on transition power of the low power node; and
information on beam direction of the low power node.

\* \* \* \* \*